United States Patent [19]

Postelson

[11] 3,955,780

[45] May 11, 1976

[54] FLYING PLATFORM

[75] Inventor: Steven Postelson, New York, N.Y.

[73] Assignee: Steven Postelson-Apostolescu, New York, N.Y.

[22] Filed: Dec. 23, 1974

[21] Appl. No.: 535,278

Related U.S. Application Data

[63] Continuation-in-part of Ser. No. 329,052, Feb. 2, 1973, abandoned.

[52] U.S. Cl. .............................. 244/12 B; 244/2; 244/43
[51] Int. Cl.² ................. B64C 29/00; B64C 15/02
[58] Field of Search .............. 244/12 R, 12 B, 12 D, 244/23 B, 43, 2, 7 R

[56] References Cited
UNITED STATES PATENTS

| | | |
|---|---|---|
| 3,265,329 | 8/1966 | Postelson (Apostolescu .............. 244/2 |
| 3,481,559 | 12/1969 | Apostolescu .......................... 244/2 |
| 3,497,163 | 2/1970 | Wakefield ........................ 244/43 X |
| 3,606,208 | 9/1971 | Postelson-Apostolescu ........ 244/7 R |

Primary Examiner—Duane A. Reger
Assistant Examiner—Barry L. Kelmachter
Attorney, Agent, or Firm—Hans Berman

[57] ABSTRACT

A hovercraft capable of free flight having lifting fans driven alternatively by a gas turbine coupled to the fan shafts or by the diverted exhaust gases of jet engines impinging on circumferential turbine blades on the fans. The jet engines normally provide propulsion, but their exhaust may be directed downward to provide lift. Baffles at the various intake and discharge ports control the direction of movement of the craft and contribute to its stability. Retractable wings enhance lift during horizontal flight.

5 Claims, 13 Drawing Figures

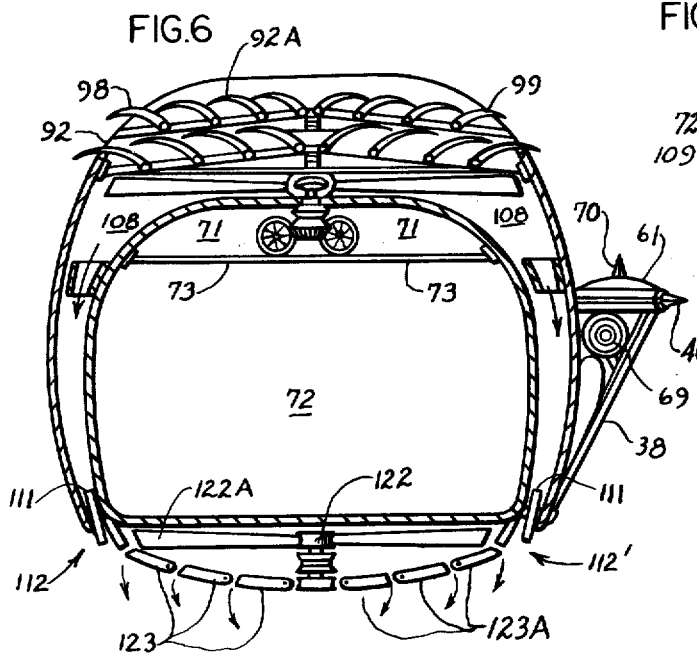
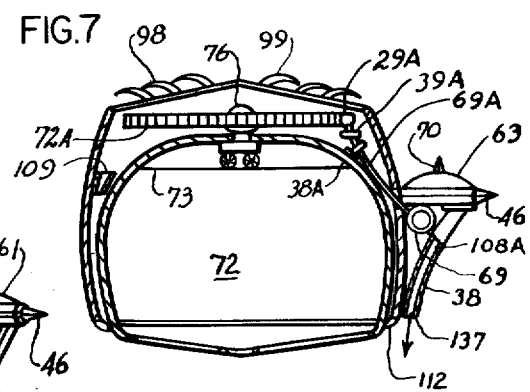
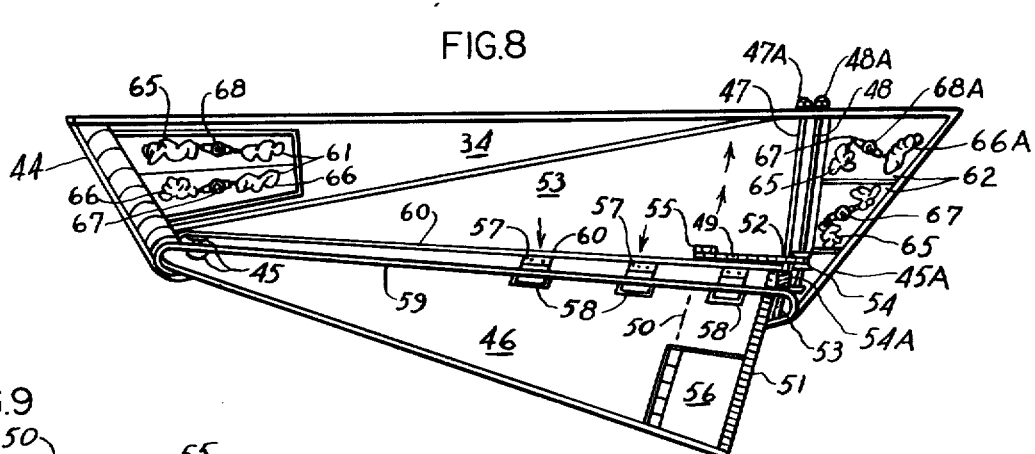
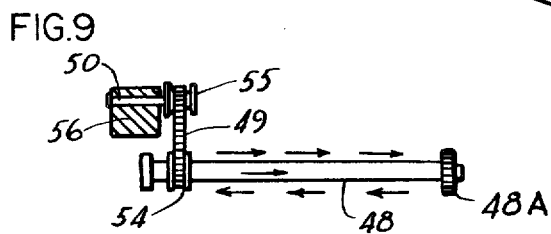
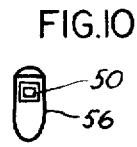
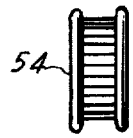
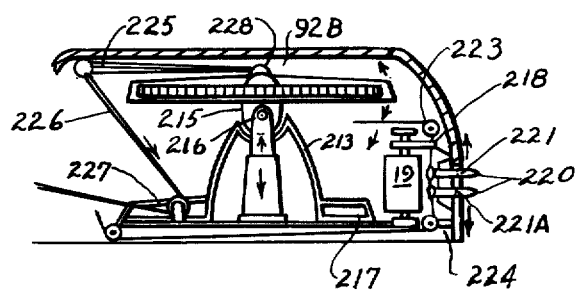

FLYING PLATFORM

This application is a continuation-in-part of my copending application Ser. No. 329,052 filed Feb. 2, 1973, and now abandoned.

This invention relates to aircraft capable of vertical and horizontal movement in air.

In my earlier U.S. Pat. Nos. 3,265,329, 3,481,559, and 3,606,208, I have disclosed and claimed a vehicle capable of vertical and horizontal flight, of hovering in mid-air, and of traveling over land and water surfaces on an air cushion produced by rotary fans installed in the body of the craft, drawing air into the body through intake ports, and downwardly discharging the air from discharge ports.

The present invention relates to improvements of the earlier inventions, both as to performance and to reliability and safety.

In its more specific aspects, the invention provides an aircraft having a blade assembly mounted in a conduit connecting intake and discharge ports in the elongated aircraft body. The assembly includes turbine blades and fan blades connected for joint rotation, the rotating fan blades drawing a stream of external air into the intake port and ejecting the stream from the discharge port. Adjustable baffles control the flow direction of the stream. Gas may be thrust against the turbine blades for thereby rotating the blade assembly.

Wing arrangements on two opposite, longitudinal sides of the aircraft body include each a first wing part fixedly mounted on the body, a pivotally mounted second wing part telescopically movable into and out of the associated fixed part, an elevator movably mounted on the movable wing part, and two operating devices on the fixed wing part. The first operating device telescopically moves the second, movable wing part, and the second operating device includes respective shafts on the two wing parts and a motion transmitting train connecting the two shafts for joint rotation during the moving of the second wing part by the first operating device, the elevator being moved by the second operating device.

An embodiment of the invention is shown in the accompanying drawing in which:

FIG. 6 is a sectional front view of the aircraft;

FIG. 7 is another sectional front view of the aircraft;

FIG. 8 is a top plan view of a wing of the aircraft;

FIG. 9 is a fragmentary view of a control mechanism for the wing of FIG. 8;

FIG. 10 is a sectional view of an elevator on the wing of FIG. 8;

FIG. 11 is a cross sectional view of a gear in the mechanism of FIG. 9;

FIG. 12 is a side view of the gear of FIG. 11; and

FIG. 13 shows the rear part of the aircraft in sectional side elevation.

Figure 1:
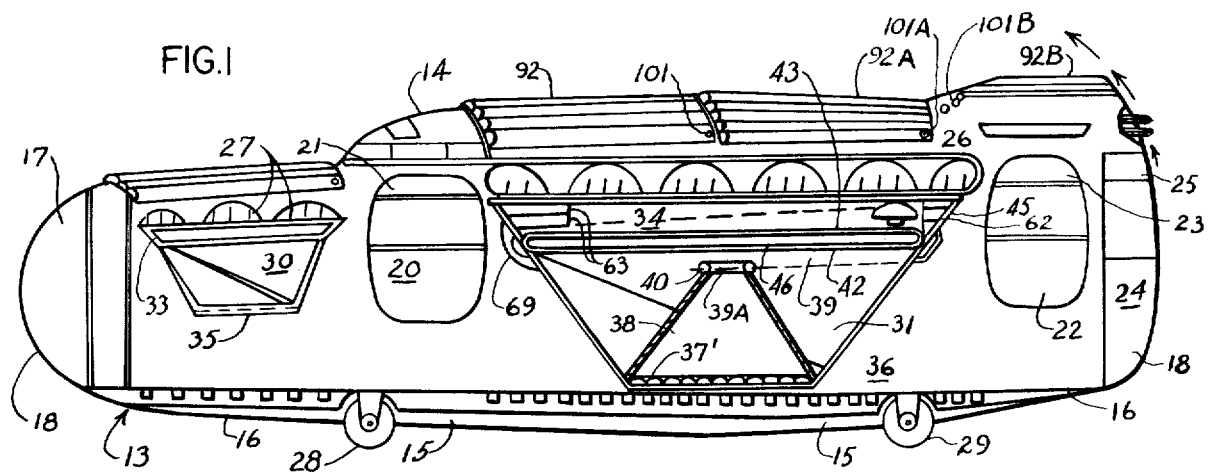
FIG. 1 is a side elevational, partly seectional view of an aircraft embodying the present invention.
Figure 2:
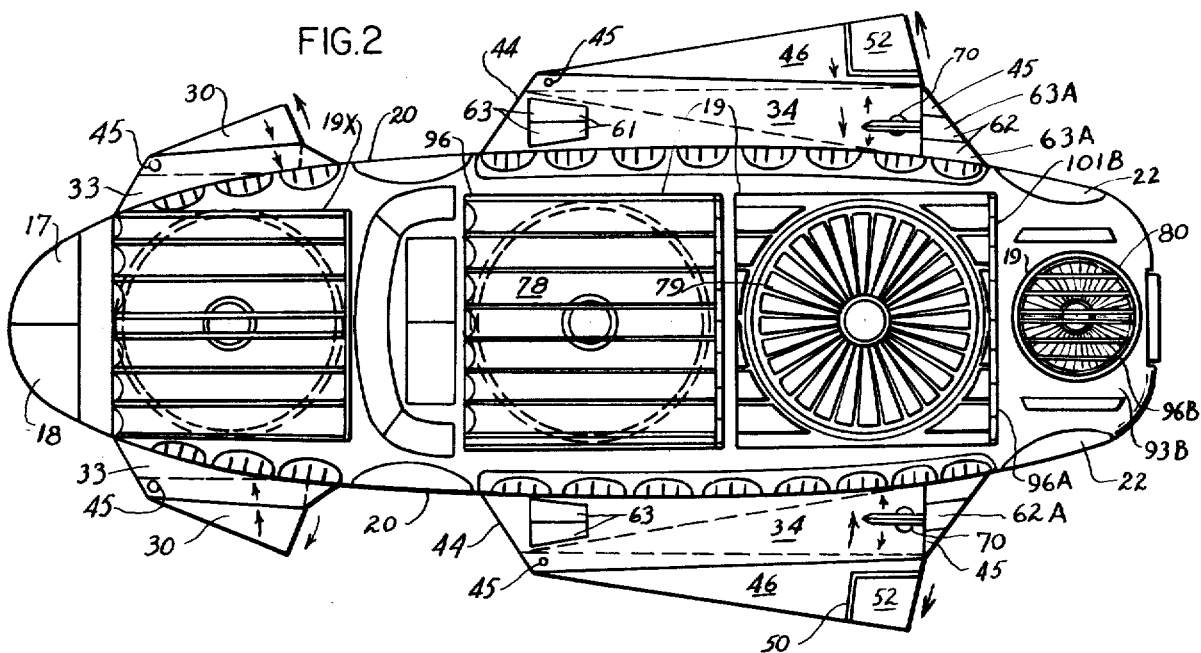
FIG. 2 is a top plan view of the aircraft of FIG. 1.

Referring now in greater detail to the drawing, there is shown in FIG. 1 an aircraft 13 constructed in accordance with the present invention. The aircraft includes an elongated fuselage or body 14 having walls 15, 16, 17, top wall. Four openings 19, 19X are formed in the wall. Doors 20 are provided in the side walls and have glass panels 21, and a pair of doors 22 is provided at the rear wall with glass panels 23. Rear twin doors 24 have glass panels 25. Windows 26 are formed in the side walls between doors 20, 22, and a window 27 between the front of the body and doors 20. Two pairs of landing wheels 28, 29 are provided with driving power as disclosed in my U.S. Pat. No. 3,361,395.

Figure 3:
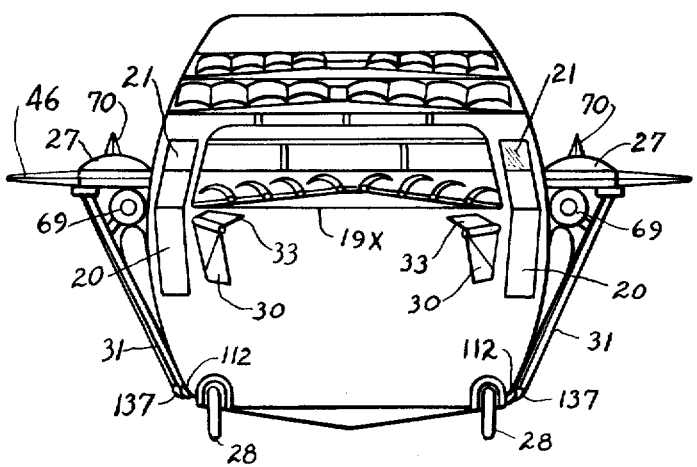
FIG. 3 is a front view of the aircraft.
Figure 4:
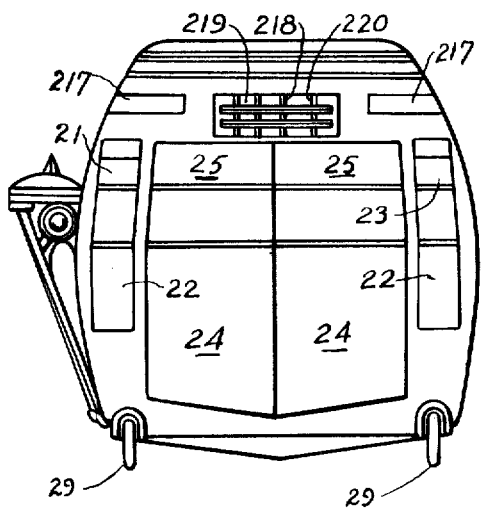
FIG. 4 is a rear view of the same aircraft.

On each side wall, fixed wings 30, 31 are provided, wing 30 being located in front of the doors 20 and a larger wing between doors 20, 22. Each wing 30, 31 appears generally triangular in front view and has a longer top edge 33, 34 but shorter bottom edge 35, 36 and downwardly and inwardly slanting sides 38. Midway between the top and bottom edges, the body of each wing 31 bulges outwardly (FIGS. 3–4). The top of each wing 31 is fixed on the adjacent side wall, and the bottom edges of the wings 31 are formed with vents 37'. Channels 38 in the wing 31 connect jet engine exhaust pipes 39 to vents 37', whereby gases from jet engines can be ejected downwardly to prevent the falling of the aircraft in an emergency landing.

The channels 38 are connected to the exhaust pipes 39 by doors 40 coupled to doors 41 on rear openings of the exhaust pipes 39. When the doors 40 are opened, the doors 41 remain closed and vice versa, as described in my U.S. Pat. No. 3,481,559. The top of the fixed wing 31 has a chamber 53 between two spacedly parallel walls 43, 42 connected by round front and rear edges 44, 45A (FIG. 8). Between the walls 43, 42 and edges 44, 45A a delta-shaped wing 46 is pivotally mounted near the edge 44 by a bolt 45, and secured to the edge 45A by a retracting mechanism which includes a shaft 47 rotating a worm gear 52 whose threads 54A mesh with a rack 51 on the trailing edge of the delta wing 46 to move the wing into and out of the chamber 53. A shaft 48 of square cross section on the fixed wing 31 carries a sliding sprocket 54 (FIGS. 9–12) which is connected by a chain 49 to a sprocket 55 on a shaft 50 of an elevator member 56 on the wing 46. The delta wing 46 moving into and out of wing 31 takes the sprocket 54 and chain 49 along because the sprocket 54 slides freely along the shaft 48. The shaft 48, when turned, moves the elevator up or down when the wing 46 is extended outward of the chamber 53. Three slots 57 in an inner edge 60 of the wing are engaged by three small projections 58 at an edge 59 of the chamber 53, whereby the wing 46 is firmly held in position.

A flexible gas pipe 69a (FIG. 7) leads from the jet engine exhaust pipe 39 through an air chamber 108 (FIGS. 5, 6) and is secured at the top of the inner wall of the air chamber 108 to a flange 38A. The outlet of flexible pipe 69A is directed toward a ring 72A of turbine blades 29A for driving a rotary fan 76. The flexible pipe 69A has a control valve 39A which, when opened, permits flow of gases from the jet engine exhaust pipe 39 against the blades 29A so that an air stream from the fan 76 provides the lift necessary for landing the aircraft safely in an emergency in a manner presently to be described.

The fixed wings 31 each carry a rudder 70 mounted at the rear end near respective parachute compartments 62, 64.

Figure 5:
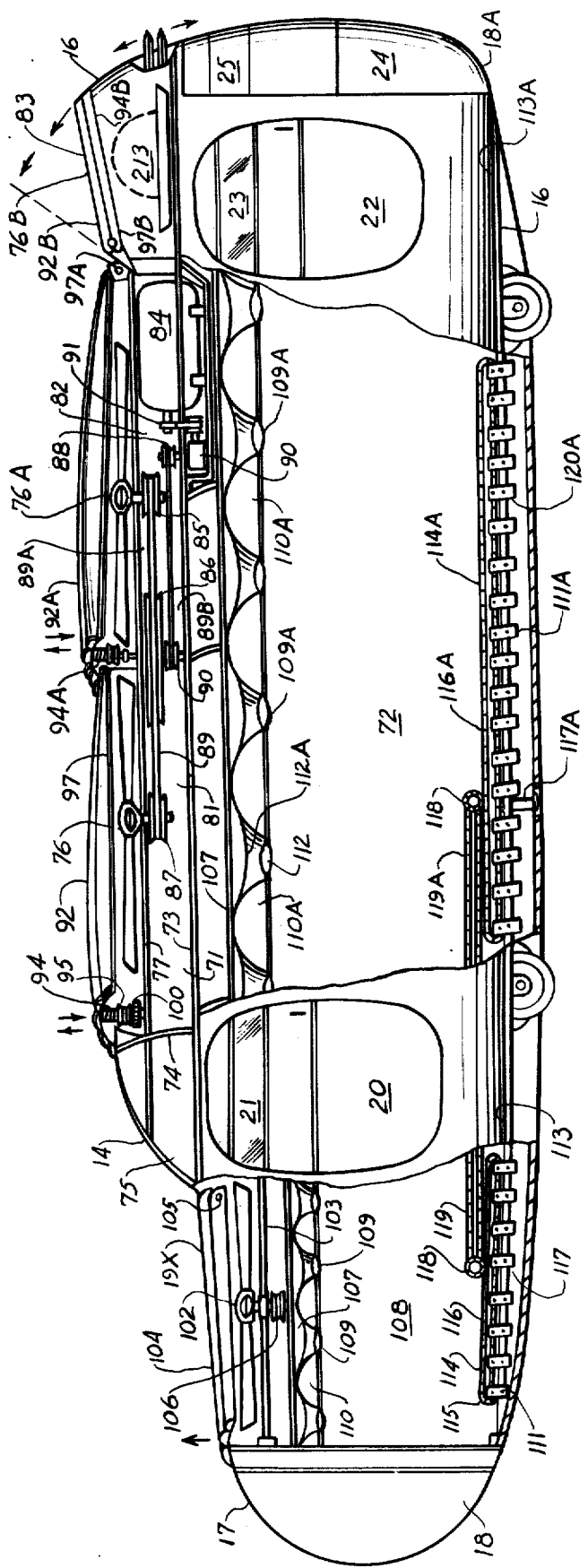
FIG. 5 is a side elevational view of the aircraft mostly in section on its median longitudinal plane.

Additional parachute compartments 61 are arranged at the front edges 44 of the fixed wing 31 (FIGS. 5 and 8). Parachutes 65 and 66 in the front compartments 61 are secured to a ring 67, parachutes 65, 66A in compartments 62 are secured to another ring 67. Rockets 68, 68A in compartments 61 and 62 are attached to doors 63, 63A which cover openings of compartments 61, 62. When the doors 63, 63A are opened, the rockets 68, 68A are automatically fired outward, taking parachutes 65, 66 with them and permitting the aircraft to land safely in an emergency.

Each fixed wing 31 supports therein a jet engine 69 connected to an exhaust pipe 39.

The interior of the fuselage is divided into compartments 71, 72 by a horizontal platform 73 (FIGS. 5 and 6). A domeshaped supporting plate 74 rises from the platform 73 behind the pilot's cabin 75 to the top of the fuselage. Behind the plate 74, three rotary fans 76, 76A, 76B are mounted on a narrow plate 77 that extends from the pilot's cabin to the rear of the fuselage. A central driving system is located between the platform 73 and the plate 77, and an engine 84 is mounted on the platform 73. The top of the fuselage has three openings or intake ports 78, 79, 80 arranged in a row from behind the cabin 75 to the rear end of the fuselage. The fans 76, 76A and 76B are mounted under respective openings in separate compartments 81, 82, 83. They are driven by the conventional gas turbine 84 through pulleys 85, 86, 87, 88 and chains or belts 89, 89A and 89B. The engine 84 is connected to a multiple-speed gear box 90 by a chain 91 so that the fans 76, 76A, 76B may be driven by the pulleys 89, 89A, 89B at different speeds according to necessity.

On top of the openings 78, 79, 80 of the fuselage, frames 96, 96A, 96B carry pivotally mounted arcuate fins 92, 92A, 92B forming two separate sets 98, 99 on each frame. By partially or totally closing the fins 98, 99, the air intake into the fuselage air passages may be controlled and the aircraft maneuvered in a safe way.

The manner of operating the frames and fins is more fully described in my Patent No. 3,606,208. The frames 96, 96A, 96B carry racks whose teeths 94, 94A, 94B are engaged by worm gears 95, 95A, 95B driven by gears 100 to raise or lower the frames. The ends 97, 97A, 97B of the frames are hingedly mounted on shafts 101, 101A, 101B on top of the fuselage. An additional opening, frame, and arcuate fin assembly of the type described is located below the front of the pilot's cabin 76. The front opening 19X at the front of the fuselage is covered by arcuate fins 104 hinged at the rear on a shaft 105, a rotary fan 102 is mounted on a plate 103, and the fan shaft carries a pulley 106 for a driving belt. A platform 107 divides the passengers' cabin from the fan and fins. Air driven by the fan 102 is directed downward through lateral air chambers 108 (FIG. 6) and air channels 109, 109A (FIG. 5) which pass between windows 110, 110A on each side of the fuselage against bottom fins 111, 111A and through vents 112, 112' into the atmosphere.

The windows 110 are mounted between the frames of channels 109, 109A which are V-shaped and have double walls 112, 112A.

The fins 111, 111A are of H-shape and are tiltably mounted on an elongated narrow plate 113 at the bottom of the air passages 108, 108A. The fins are further tiltably secured to a narrow plate 114, 114A by pins 115. The plates 114, 114A carry racks 116, 116A meshing with worm gears 118, 118A mounted on brackets 117, 117A. Gears 118, 118A, when turned by chains 119, 119A, move the fins pivotally to provide lift, forward, or rearward propulsion. The fins 111, 111A are pivotally mounted on pins 120, 120A.

Below the passenger compartment 72 (FIG. 6) a rotary fan 122 having blades 122A is mounted and normally covered by sliding doors 123, 123A. The fan 122 can be operated to discharge air downward through the open doors 123, 123A to provide lift during an emergency landing.

A rear rotory unit 92B (FIG. 13) in compartment 80 includes a dome-shaped plate 213 supported on the rear end of the platform 73. The plate 213 has a central recess in which a hollow cylindrical casing 215 having a curved bottom is arranged. Two hydraulic jacks 216 are mounted on respective sides of the casing 215 and may turn the rotor unit 92B to the right or left. The compartment 80 has no double walls with air passages, but doors 217 that can be opened as needed to direct the aircraft to the left or right. The rotor 92B can be raised for use as a pusher when the aircraft is flying to provide extra speed. During landing, the rotor unit 92B will be returned to its normal horizontal position inside the compartment 80.

Near a rear opening 218 of the compartment 80, two sets of fins are mounted. One set is arranged vertically as rudders 219 inside the compartment 80, the other fins are elevators 220 which are mounted in the rear opening 218 on pins 221, 221A and are operated by wires trained over pulleys 223, 224. The rotor 92B has attached at its hub 228 a metal bar 225 mounted on a ball bearing and attached to a wire 226 trained over a pulley 227. When the wire is pulled, the rotor head 92B is tilted to a vertical position for use as a pusher for added speed.

When on the ground, the aircraft may roll on its four wheels. It may also be operated as a hovercraft because of its air pressure system. When on water, it may operate as a boat using the rear rotor 92B as a pusher or as a hovercraft. The same system of propulsion can be used over snow or ice. For take-off, the engine 84 of the central driving system is activted so that the fans 76, 76A, 76B and 104 provide the lift necessary to raise the aircraft upward vertically. When the aircraft has arrived at the desired altitude, the delta wings 46 are extended outward of the fixed wings 31 while the jet engines 69 are activated to propel the aircraft. The rotary fans 76, 76A, 76B and 104 are operated during flight and until the landing.

The aircraft has three safety devices. The parachutes 65, 66 can be ejected from the compartments 61, 62 in the fixed wings 31 in an emergency to land the aircraft safely. The fans 76, 76A, 76B and 102 are normally driven by the engine 84, but in case of engine failure, lifting power is provided by exhaust gases of the jet engine 69 acting on the turbine 72A which turns the fans 76, 76A, 76B and 104 for landing the aircraft and its passengers. Thirdly, the channels 38 in the fixed wings 31 may be connected to the exhaust pipes 39 so that jet exhaust gases are ejected downward into the atmosphere and will brake the falling of the aircraft in an emergency.

I claim:
1. An aircraft comprising:
   a. an elongated aircraft body formed with an intake port and a discharge port and defining therein a conduit connecting said ports;
   b. blade means mounted in said conduit and including turbine blades and fan blades connected for joint rotation, said fan blades when rotating drawing a stream of external air into said intake port and ejecting said stream from said discharge port;

c. adjustable baffle means for controlling the direction of flow of said stream;
d. gas thrust means for thrusting a gas against said turbine blades and for thereby rotating said blade means; and
e. wing means on two, opposite, longitudinal sides of said body, each wing means including a first wing part fixedly mounted on said body, a pivotally mounted second wing part telescopically movable into and out of said first part, an elevator member movably mounted on said second wing part, first operating means on said first wing part for telescopically moving said second wing part, and second operating means on said first wing part for moving said elevator member relative to said second wing part, said second operating means including respective shafts on said first and second wing parts, and motion transmitting means connecting said shafts for joint rotation.

2. An aircraft as set forth in claim 1, wherein said gas thrust means include a jet engine and exhaust means receiving exhaust gases from said engine and including a plurality of exhaust conduits, one of said exhaust conduits having an orifice adjacent said turbine blade elements, and another exhaust conduit being directed longitudinally of said body for providing propulsion to the aircraft, and control means for selectively directing said exhaust gases to said exhaust conduits.

3. An aircraft as set forth in claim 2, wherein yet another of said exhaust conduits is directed downward for providing lift to said aircraft.

4. An aircraft as set forth in claim 1, further comprising additional blade means mounted on said body for rotation about an axis and including a plurality of fan blades, said additional blade means communicating with the external air for propelling a stream of said air axially during said rotation, and control means for pivotally moving said axis in a plane longitudinal relative to said body.

5. An aircraft as set forth in claim 1, wherein said body is formed with an additional discharge port communicating with said conduit, said discharge ports being spaced from each other transversely of the direction of elongation of said body and being directed downwardly.

* * * * *